United States Patent
Padmanabh et al.

(10) Patent No.: US 8,649,298 B2
(45) Date of Patent: Feb. 11, 2014

(54) METHOD AND SYSTEM FOR CREATING A VIRTUAL WIRELESS SENSOR NETWORK

(75) Inventors: Kumar Padmanabh, Gorakhpur (IN);
Adi Mallikarjuna Reddy Vanteddu, Kurnool (IN); Sougata Sen, Bangalore (IN); Amrit Kumar, Bhagalpur (IN); Puneet Gupta, Bangalore (IN); Lakshya Malhotra, New Delhi (IN); Sunil Kumar Vuppala, Bangalore (IN)

(73) Assignee: Infosys Technologies, Ltd., Bangalore (IN)

( * ) Notice: Subject to any disclaimer, the term of this patent is extended or adjusted under 35 U.S.C. 154(b) by 265 days.

(21) Appl. No.: 13/325,169

(22) Filed: Dec. 14, 2011

(65) Prior Publication Data

US 2012/0176938 A1 Jul. 12, 2012

(30) Foreign Application Priority Data

Jan. 12, 2011 (IN) ................................ 98/CHE/2011

(51) Int. Cl.
*H04W 84/18* (2009.01)
(52) U.S. Cl.
USPC .......................................... 370/255; 709/244

(58) Field of Classification Search
USPC .......... 370/255, 252, 328; 703/16, 17, 20–22, 703/26, 5; 709/205, 224, 228
See application file for complete search history.

(56) References Cited

U.S. PATENT DOCUMENTS

| 8,140,658 | B1 * | 3/2012 | Gelvin et al. | 709/224 |
| 2003/0171827 | A1 * | 9/2003 | Keyes et al. | 700/19 |
| 2005/0288904 | A1 * | 12/2005 | Warrior et al. | 702/188 |

* cited by examiner

*Primary Examiner* — Thai Nguyen
(74) *Attorney, Agent, or Firm* — LeClairRyan, a Professional Corporation (57) ABSTRACT

A method for creating a virtual Wireless Sensor Network (WSN) is disclosed. The method includes extracting one or more niceties of a physical WSN and embedding at least one of the extracted niceties in a soft object to represent one or more sensor nodes of the physical WSN. The method includes, sending equivalent command to the one or more sensor nodes of the physical WSN, when one or more changes are performed on corresponding niceties of the soft object. Further, the method adding or deleting one or more niceties corresponding to the one or more sensor nodes from the soft object upon ingress or egress of the one or more sensor nodes in the physical WSN. The method also includes steps of building application using the soft object of the virtual WSN.

21 Claims, 4 Drawing Sheets

METHOD AND SYSTEM FOR CREATING A VIRTUAL WIRELESS SENSOR NETWORK

This application claims the benefit of Indian Patent Application Filing No. 98/CHE/2011, filed Jan. 12, 2011, which is hereby incorporated by reference in its entirety.

TECHNICAL FIELD

The present invention generally relates to wireless sensor networks (WSN), and particularly, to a method and system for creating a virtual WSN corresponding to a physical WSN and building an application using the virtual WSN.

BACKGROUND

Typically, a WSN includes a plurality of sensor nodes connected wirelessly using a mesh network. The WSN is deployed to monitor either physical or environmental conditions. The monitoring may happen periodically without human intervention. The condition may include at least one of a temperature, sound, vibration, pressure, motion and pollutant. Based on the requirements, potential applications may be developed for deploying the WSN in industries for monitoring one or more such conditions.

The WSN application may also be used to actuate an electrical device. To actuate such an electrical device, a command may be sent wirelessly to a corresponding sensor node, where the electrical device is connected.

The process of developing such an application includes writing codes in the physical WSN based on components and wiring that are different from traditional coding techniques. However, the process of developing the application suffers from one or more of the following limitations: The sensor nodes of the physical WSN may contain a very low amount of memory. The low amount of memory available on the nodes may create difficulty for a developer to write the code in the sensor nodes for creating the application. Further, the developer may require knowledge of dealing with complex and low-level application programming interfaces (APIs) of various resources or niceties in the sensor node of the physical WSN.

Thus, in light of the foregoing discussion, there is a need for a system and a method to obtain resource details of the physical WSN and enable the developer to easily create the applications. Further, the system and method should not require the developer to have knowledge of complex and low-level APIs of resources in the sensor node of the physical WSN.

SUMMARY OF THE INVENTION

One objective of the present invention is to create a virtual WSN, which reflects the one or more sensor nodes of the physical WSN.

Another objective of the present invention includes providing means for accessing various resources or niceties in the sensor nodes in the physical WSN for the developer to build the application just by focusing on the application logic, rather than resource details of physical WSN.

A method and system of creating a virtual wireless sensor network (WSN) corresponding to a physical WSN are disclosed. Also, a method of building an application using such a virtual WSN is disclosed. Such a method may help a developer in building the application just by focusing on the application logic, rather than on resource details of the physical WSN.

In one embodiment of the present technique, a computer implemented method of creating a virtual wireless sensor network WSN includes the step of extracting one or more niceties of a physical WSN. The step of extracting the one or more niceties comprises determining a communication mode between a plurality of sensor nodes of the physical WSN and a base station, and segregating a plurality of packets exchanged by the plurality of sensor nodes of the physical WSN and the base station. Further, the step of extracting includes identifying a source sensor node and a traversed network path of the plurality of segregated packets and transforming at least one of sensor data and control data from the plurality of segregated packets into a predefined format.

Further, the step of creating the virtual sensor network includes the step of embedding at least one of the extracted niceties in a soft object to represent one or more sensor nodes of the physical WSN.

In one embodiment of the present technique, the step of extracting the niceties of the physical WSN masks the communication details, networking, and provides higher-level abstractions to virtual layer or the soft object to aid the developer in application development. Thus, in one embodiment of the present technique, the virtual layer may assist the developers in creating applications without knowing the low-level details of the physical system, which includes knowledge of specific programming languages or being bound to specific platform for developing a WSN application.

In another embodiment of the present technique, a computer implemented method of building an application using such a virtual WSN is disclosed.

The step of building an application using a virtual WSN includes the step of identifying a plurality of sensor nodes of a physical WSN embedded in the form of a soft object for creating the application. Further, the step includes obtaining access to one or more niceties of the plurality of identified sensor nodes embedded in the soft object through a graphical user interface (GUI) for updating the one or more niceties of the plurality of identified sensor nodes in the soft object to obtain a desired functionality of the application. Finally, the step includes deploying such changes on a corresponding sensor node in the physical WSN by transferring the update performed on the identified sensor nodes in the soft object to build the desired application.

In one embodiment of the present technique, the soft object, which represents one or more sensor nodes of the physical WSN, is in at least one of an XML format, a comma separated value (csv) format, and a Java object format.

In one embodiment of the present technique, the soft object or a virtual layer consisting of virtual sensor nodes is provided as an interface to relieve the developer from dealing with complex and low-level application programming interfaces (APIs) of various resources in the sensor nodes of the physical WSN.

BRIEF DESCRIPTION OF THE DRAWINGS

The above mentioned features as well other features, aspects, and advantages of the present invention will become better understood when the following detailed description is read with reference to the accompanying drawings in which like characters represent like parts throughout the drawings, wherein.

DETAILED DESCRIPTION

The following description is full and informative description of the best method and system presently contemplated for carrying out the present invention, which is known to the inventors at the time of filing the patent application. Of course, many modifications and adaptations will be apparent to those skilled in the relevant arts in view of the following description, in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

The present invention relates to a method and system for creating a virtual WSN corresponding to a physical WSN. The method also discusses an approach for building an application using the virtual WSN. The inventive technique to be detailed in the subsequent sections also explains numerous variations that may be used to implement the inventive steps of the present technique in terms of one or more embodiments.

The following description is presented to enable a person of ordinary skill in the art to make and use the invention and is provided in the context of the requirement for obtaining a patent. The present description is the best presently contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

In one embodiment of the present invention, the method includes the steps of creating a virtual WSN, which consist of a soft object representing one or more physical wireless sensor nodes. The soft object acts as an interface to relieve a developer from dealing with complex and low-level application programming interfaces (APIs) of various resources in the sensor nodes. The soft object may mask the communication & networking details and may provide high level abstractions in the upper layer to the developer to alleviate building WSN application.

Figure 1:
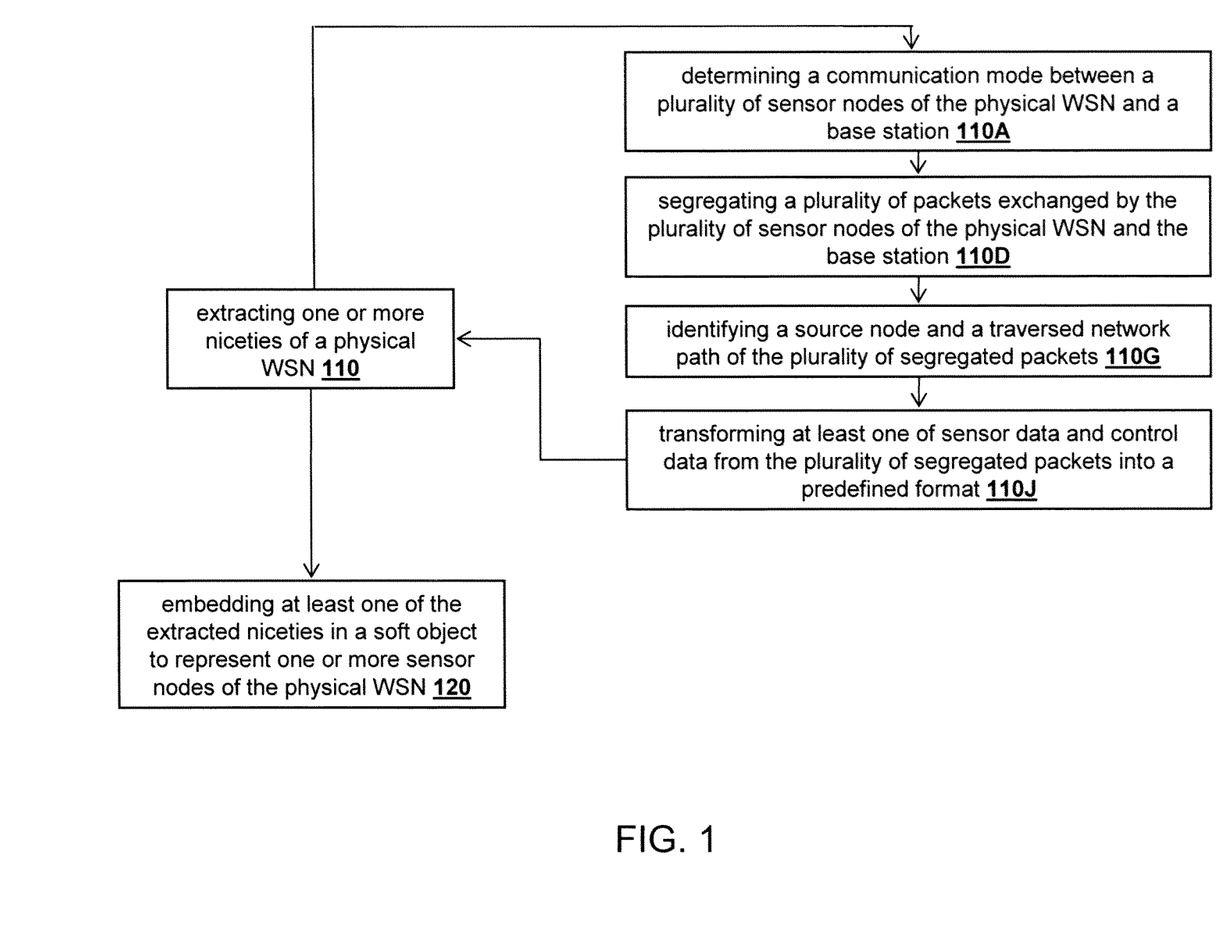
FIG. 1 is a flow diagram depicting a method of creating a virtual wireless sensor network (WSN), according to one embodiment of the present technique.

Referring to the figures, FIG. 1 is a flow diagram depicting a method of creating the virtual WSN, according to one embodiment of the present technique.

In one embodiment of the present technique, the method comprises: 1) extracting one or more niceties of a physical WSN (block 110), wherein extracting the one or more niceties comprises the sub steps of 1a) determining a communication mode between a plurality of sensor nodes of the physical WSN and a base station (block 110A), 1b) segregating a plurality of packets exchanged by the plurality of sensor nodes of the physical WSN and the base station (block 110D), 1c) identifying a source sensor nodes and a traversed network path of the plurality of segregated packets (block 110G), 1d) transforming at least one of sensor data and control data from the plurality of segregated packets into a predefined format (block 110J), 1e) decoding the response received from the one or more sensor nodes by the WSN server application (block 110M), and 2) embedding at least one of the extracted niceties in a soft object to represent one or more sensor nodes of the physical WSN (block 120). Each of these steps is explained in detail in the subsequent sections.

The method of creating a virtual WSN begins with a step of extracting one or more niceties of a physical WSN as represented by block 110. In one embodiment of the present technique, the niceties include minutiae of one or more sensor nodes of a physical WSN.

The step of extracting the one or more niceties comprises one or more sub steps. In one embodiment of the present technique, the sub steps include determining the communication mode between the plurality of sensor nodes of the physical WSN and the base station, as represented by block 110A. In one embodiment of the present technique, the communication mode includes at least one of serial communication, USB communication, Ethernet communication and wireless communication.

In one embodiment of the present technique, the determined communication modes are translated into details of a predetermined communication mode irrespective of the type of communication mode used between the sensor nodes and the base station to communicate. The predetermined communication details may include converting the communication modes between the one or more sensors nodes and the base station, through a middleware application. In one embodiment of the present invention, the middleware application may determine the communication mode details automatically by sending one or more handshake data packets or messages to an hardware interface of a gateway through which the base station and the sensor nodes are connected for communication. The handshake data may be transmitted in a sequential format i.e. in Ethernet mode, USB mode, Serial port mode and Parallel port mode or the like. The sequence may vary depending on the underlying middleware and application requirement. The hardware interface may acknowledge such one or more handshake packets, which it may able to interpret. Based on the acknowledgement, the communication between the base station and the sensor nodes is established and the identified communication modes details are converted into a base format for virtual WSN network for further interpretation. The rest of the communication modes of the gateway between the sensor nodes and the base station are disabled. The disabled information is also recorded in the base format for virtual WSN network for further interpretation.

In another embodiment of the present technique, the middleware application may determine the communication mode details manually. The manual process may include providing a graphical user interface for the selection of the communication mode between the base station and the one or sensor nodes.

The step of extracting the niceties further comprises a process of segregating the plurality of packets into at least one of a data packet and a non-data packet, as represented by block 110D. The plurality of packets may be exchanged between the one or more sensor nodes and the base station.

In one embodiment of the present technique, the data packets may include at least one of a header section and a body section. The header section of the data packet includes at least one of the following: a source identity (source sensor nodes), a destination identity (destination sensor nodes), an importance level, a group identity, a parent sensor node identity, a last forwarded sensor node identity, a hop count number, a sequence number of the information data packet, or combinations thereof. Similarly, the body section of the data packet includes at least one of the following: monitored information gathered from the sensor nodes' reading, a reply message from the sensor nodes to a request message sent from the base station, a reply for a plurality of acknowledgement sent from the base station, or combinations thereof.

The body section of the data packet may help in determining the type of data or message being exchanged between the sensor nodes and the base station. The message may include at least one of a control message and a sensor message. The control messages are always sent from the base station, unlike the sensor messages, which are sent from the one or more sensor nodes of the physical WSN. The control message may include instruction information, from the base station, for at least one or more sensor nodes to perform certain actions based on receipt of the same. The sensor message may include any general information which the base station may want from the respective sensor nodes, to sense and send periodically, depending on the WSN application for which the sensor nodes are deployed.

In one embodiment of the present technique, the packets are available in a circular queue. The step of segregation (block 110D) may further include processing of the packets based on their type. The packet type may depend on a platform and an operating system that are used in the sensor nodes or the base station. The processing of the packet involves extracting each field (i.e. header or body) and interpreting it to determine what subsequent action needs to be performed.

The step of extracting the niceties additionally comprises a process of identifying the source sensor node and traversed network paths of the plurality of segregated packets, as represented by block 110G.

In one embodiment of the present technique, the identification of the source sensor node may include identifying information of the sensor node that is generating the data packet. The traversed network path may include the identity information of at least one of the source sensor node, an intermediate sensor node, a destination sensor node and one or more optimal paths followed by the data packet to reach the base station.

The intermediate sensor nodes may be one or more sensor nodes that are close to the source sensor nodes. Similarly, the destination sensor node is at least one of the sensor nodes or the base station itself, to which the data packets are destined. The destination sensor node identity may include the identity details of the intermediate sensor nodes, to which the data packet is intended to be shared from the source sensor node.

The optimal path may be the path traversed by the source sensor node to reach the base station or any other destined sensor node based on an advertisement message received from one or more adjacent sensor nodes for transmitting or hopping the information gathered by the source sensor node.

In another embodiment of the present technique, the traversed network path may include a direct communication from the source sensor node to the base station, without any intermediate or destination sensor nodes.

The step of extracting the niceties finally includes a process of transforming at least one of the sensor data and control data from the plurality of segregated packets into a predefined format, as represented by block 110J.

In one embodiment of the present technique, the process of transforming at least one of the sensor data or the control data may include transforming the data into a predefined format or platform independent format. The transformation of data (i.e. sensor or control) identifies the underlying coded information of the sensor messages and the control messages, as also the hardware, the embedded software platform details of the base station and the sensor nodes. The said identified information is processed based on a unique identity of the platform and is encoded into the packet to convert it into a platform-independent format. In another embodiment of the present technique, the method of transforming the sensor data or control data includes the step of applying engineering conversion formulas or calibrating and inserting the calibrated engineering units into a database.

The method of creating a virtual WSN may further include the step of embedding at least one of the extracted niceties in a soft object to represent one or more sensor nodes of the physical WSN, as represented by block 120.

In one embodiment of the present technique, the step of embedding the one or more niceties of the sensor nodes of the physical WSN includes recording the niceties in at least one of an XML format, a comma separated value (csv) format, and a Java object format. It should be noted that other formats that have not been mentioned above may also be used for embedding the one or more niceties without deviating from the scope of the present technique.

The soft object may mask the communication & networking details, operating system or details of a special programming language used in the WSN and may provide high level abstractions in the upper layer to the developer to alleviate in building wireless WSN application. The method further includes providing a graphical user interface (GUI) for displaying the soft object of the virtual WSN to the developer.

In one embodiment of the present technique, the method further includes providing an API for performing at least one update on the soft object by a developer, while developing the WSN application. The updates performed on the soft object (which represents the one or more sensors nodes of the physical WSN) may be deployed on the corresponding sensor nodes of the physical WSN, using an equivalent command that would be sent wirelessly.

In another embodiment of the present technique, the method further includes providing a command prompt for performing at least one update on the soft object by a developer while developing the WSN application.

The method also includes storing the soft object comprising the embedded niceties in the database.

Further, the method includes adding corresponding niceties in the soft object when one or more new sensor nodes are added in the physical WSN. Additionally, the method includes deleting corresponding niceties in the soft object when one or more existing sensor nodes are deleted in the physical WSN.

In one embodiment of the present technique, the soft objects which represent the one or more sensor nodes of the physical WSN may be used to send the control commands to actuate electrical devices. The electrical devices may be interfaced with the one or more sensor nodes of the physical WSN. The commands may be passed on through the gateway which acts as the interface between the base station and the one or more sensor nodes of the physical WSN. The base station may include the soft objects and may be made accessible for the developer to perform edits.

The control commands may control instructions to change the behavior of the one or more sensor nodes to suit the WSN application requirement. The sensor nodes upon receiving the control commands may sense different parameters as instructed by the base station, through the control commands.

The one or more sensor nodes may send the sensed information to the base station. The base station may send the control command to change the behavior of the sensor nodes and may also actuate one or more electrical devices for performing certain actions, which may include switching a fan attached to the one or sensor nodes of the physical WSN.

The addition of niceties in the soft object may happen when the one or more sensor nodes become active after a brief sleep state or when a new sensor node is added to the physical WSN. Similarly, the deletion of niceties in the soft object may happen when the one or more sensor nodes move into a sleep state or when the power of the sensor nodes gets exhausted or when an existing sensor node is deleted from the physical WSN.

Figure 2:
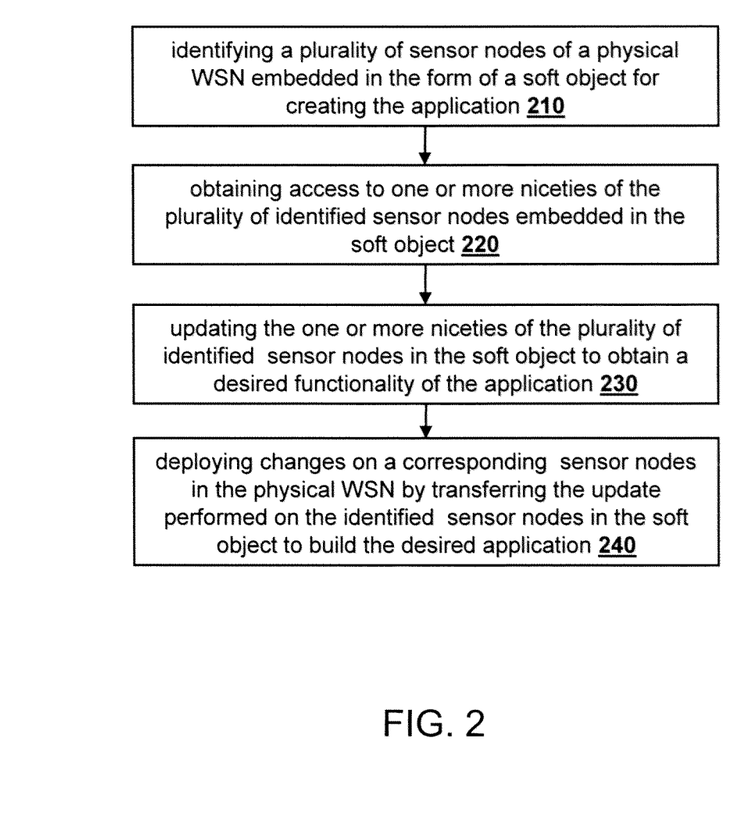
FIG. 2 is a flow diagram depicting a method of building an application using the virtual WSN, according to one embodiment of the present technique.

Referring to the figures, FIG. 2 is a flow diagram depicting the method of building the application using the virtual WSN, according to one embodiment of the present technique.

In one embodiment of the present technique, the method of building the application using the virtual WSN comprises: 1) identifying a plurality of sensor nodes of a physical WSN embedded in the form of a soft object for creating the application (block 210), 2) obtaining access to one or more niceties of the plurality of identified sensor nodes embedded in the soft object (block 220), 3) updating the one or more niceties of the plurality of identified sensor nodes in the soft object to obtain a desired functionality of the application (block 230) and 4) deploying changes performed on the identified sensor nodes in the soft object by transferring to a corresponding sensor node in the physical WSN to build the desired application (block 240). Each of these steps is explained in detail in the subsequent sections.

The built application may be used for monitoring at least one of temperature, sound, vibration, pressure, motion and pollutant. In another embodiment of the present technique, the built application may be used for actuating an electrical device attached with the one or more sensors nodes of the physical WSN. Other applications which are not mentioned above may also be built to monitor, without deviating from the scope of the present technique.

The method of building the application using the virtual WSN may begin with a step of identifying the plurality of sensor nodes of the physical WSN embedded in the form of a soft object for creating the application, as represented by block 210. In one embodiment of the present technique, the step of identifying sensor nodes includes verifying one or more sensor nodes that are available in the WSN network to be considered for building the application. The process of verification includes checking the necessary authentication of the one or more sensor nodes belonging to the particular WSN network. Any known method of authenticating the plurality of sensor nodes of the physical WSN may be used for identifying the appropriate sensor nodes for building the application, without deviating from the scope of the patent application.

The method further includes the step of obtaining access to one or more niceties of the plurality of identified sensor nodes embedded in the soft object, as represented by block 220. In one embodiment of the present technique, the step additionally includes creating the soft object comprising niceties of the one or more sensor nodes of the physical WSN, as depicted above using details from FIG. 1. The creation of the soft object is essential to provide the sensor node details, in the upper layer or the soft object for the developer to alleviate in building the WSN application.

In one embodiment of the present technique, the access to the soft object may be attained through a graphical user interface (GUI). In another embodiment of the present technique, the access to the soft object may be attained through the command prompt of the base station.

In one embodiment of the present technique, the step of obtaining access to the niceties of the plurality of identified sensor nodes includes accessing the soft object with the one or more niceties of the sensor nodes of the physical WSN in at least one of an XML format, a comma separated value (csv) format, and a Java object format. The soft objects may be accessed using the corresponding API of the language in which the soft object is opened by the developer.

The method further includes the step of updating the one or more niceties of the plurality of identified sensor nodes in the soft object to obtain a desired functionality of the application, as represented by block 230.

In one embodiment of the present technique, the step includes providing an API for the developer to edit the one or more niceties of the corresponding sensor nodes. The API may depend on the platform in which the soft objects are opened for editing. In turn, the edits may correspond to the type of application the developer is developing, i.e., the edits may correspond to the setting or changing one or more parameters that are applicable to monitor at least one of temperature, sound, vibration, pressure, motion and pollutant.

The method of building the application further includes the step of deploying changes on the corresponding sensor node in the physical WSN by transferring the update performed on the identified sensor nodes in the soft object to build the desired application, as represented by block 240.

In one embodiment of the present technique, the method of building the application includes generating an equivalent command based on the updated parameter/actions performed on the soft object to deploy the changes on the sensor nodes of the physical WSN. The deployment may change the parameter that is being used to monitor the application. Additionally, the changes may include setting up a new parameter for monitoring purposes i.e. for monitoring temperature or light or motion or the like.

The deployment of the changes performed on the niceties is incorporated on the sensor nodes of the physical WSN by editing the changes automatically from the predefined format to the specific format of the sensor nodes of the physical WSN, where the deployment is being performed. The process of automatically changing or converting the edits from the predefined format to the specific format includes transforming the edits in specific format to the appropriate network and communication mode of the sensor node of the physical WSN, where the deployment is being performed.

Figure 3:
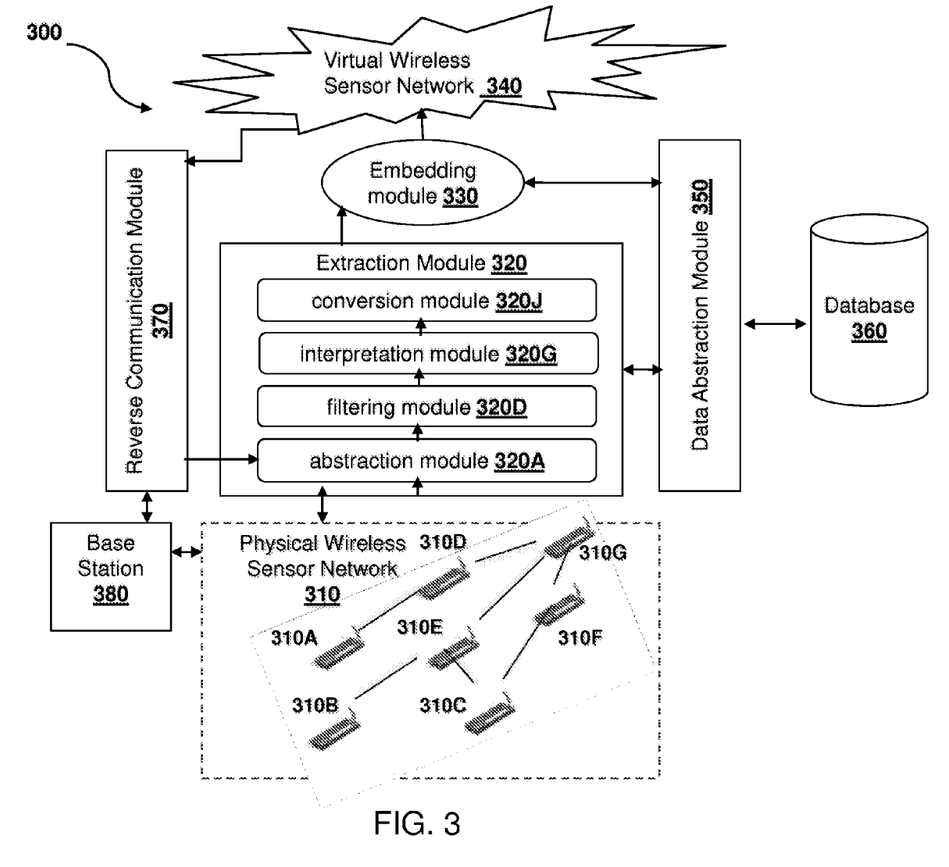
FIG. 3 is a block diagram illustrating creation of the virtual WSN corresponding to a physical WSN, according to one embodiment of the present technique.

Referring to the figures, FIG. 3 is a block diagram illustrating creation of the virtual WSN corresponding to the physical WSN, according to one embodiment of the present technique.

In one embodiment of the present technique, the block diagram 300 illustrates a system creation of the virtual WSN corresponding to the physical WSN. In one embodiment of the present technique, the system 300 includes at least one of a physical WSN 310, an extraction module 320, an embedding module 330, a virtual WSN 340, a database abstraction module 350, a database 360 and a reverse communication module 370.

In one embodiment of the present technique, the physical WSN 310 may include one or more sensor nodes 310A-G, depending on the application for which the physical WSN is being used. The sensor nodes 310A-G in the physical WSN 310 may monitor the condition for which the physical WSN is being configured. One or more sensor nodes may be added into the physical WSN 310 depending on either the requirement of the application or invocation of one or more sensor nodes from the sleep state.

In one embodiment of the present technique, the extraction module 320 of the present technique is configured for extracting one or more niceties related to the one or more sensor nodes of the physical WSN. In one embodiment of the present technique, the niceties may include at least one of the following: the communication mode, network information, the platform details, the operating system, or combinations thereof Typically, the niceties include minutiae of one or more sensor nodes of a physical WSN.

The extraction module 320 includes one or more sub modules which may aid in extraction of one or more niceties of the sensor nodes of the physical WSN. The sub modules include one or more of an abstraction module 320A, a filtering module 320D, an interpretation module 320G, and a conversion module 320J.

In one embodiment of the present technique, the abstraction module 320A allows extraction of communication mode or connection of the physical WSN 310 with the base station 380 through at least one of a serial port or USB port or an Ethernet port or any other physical interface of the computer which may connect the peripheral devices. This abstraction may be used for two-way communication, i.e., from the physical WSN to the base station 380 and vice versa. Additionally, the abstraction module 320A may receive a raw byte stream from the communication port and form raw packets or data packets out of it. Such data packets are queued up in a circular queue for further processing by the filtering module 320D.

In one embodiment of the present technique, the filtering module 320D may receive the data packet available in the circular queue and segregate the data packets by processing it according to the type of the data packets available. The type of the data packets may additionally depend on the type of the platform and the operating system that are being used in the sensor nodes or the base station 380. The step of processing the data packets may include extracting each field of the data packets and interpreting it. The fields of the data packets may include a header section and a body section of the data. The header of the data packets may provide information pertaining to one or more of the following: a source identity (i.e. source sensor nodes), a destination identity (i.e. destination sensor nodes), an importance level, a group identity, a parent sensor node identity, a last forwarded sensor node identity, a hop count number, a sequence number of the information data packet, or combinations thereof. Similarly, the body section of the data packet may include at least one of monitored information gathered from the sensor nodes reading, a reply message from the sensor nodes to a request message sent from the base station 380, a reply for a plurality of acknowledgement messages sent from the base station 380, or combinations thereof.

The body section of the data packet may help in determining the type of data or message being exchanged between the sensor nodes and the base station 380. The message may include at least one of a control message and a sensor message. The control message may include instruction information, from the base station 380, for at least one or more sensor nodes to perform certain actions based on receipt of the same. The sensor message may include any general information which the base station may want from the respective sensor nodes, to sense and send periodically, depending on the WSN application for which the sensor nodes are deployed.

In one embodiment of the present technique, the interpretation module 320G performs the step of identifying the source sensor node and a traversed network path of the plurality of segregated data packets. The identification of the source sensor node may include identifying information of the sensor node that is generating the data packet. The traversed network path may include the identity information of at least one of the following: the source sensor node, an intermediate sensor node, a destination sensor node, and one or more optimal paths followed by the data packet to reach the base station 380.

In one embodiment of the present technique, the conversion module 320J performs the step of transforming at least one of the sensor data or the control data into a predefined format or a platform-independent format. The transformation of the sensor data or the control data into a platform-independent format includes the step of extracting a unique platform identifier and transmitting the packet to a specified processor that may convert the information embedded into the packet into a universal packet format. In another embodiment of the present technique, the conversion module 320J may additionally apply engineering conversion formulas, calibrating data and insert the calibrated engineering units to the data.

In one embodiment of the present technique, the conversion module 320J may pass on the data to the data abstraction module 350. The data abstraction module 350 may submit the transformed data to the database 360 for storing purposes. The database abstraction module 350 may provide an easy interface to access the database 360. It may facilitate retrieving or inserting the transformed sensor data or control data into the database 360. It may additionally support MySQL, SQLServer, MS-Access and Oracle databases 360. Only one instance of the database connection may be used throughout the system 300. In another embodiment of the present technique, the data abstraction module 350 may also additionally transform the sensor data or the control data into a predefined format or a platform-independent format before submitting the same to the database 360 for storing it.

In one embodiment of the present technique, the system 300 includes the embedding module 330 for embedding one or more niceties extracted from the one or more sensor nodes of the physical WSN. The extracted niceties are extracted in a soft object, which eventually represents one or more sensor nodes of the physical WSN. In one embodiment of the present technique, the embedding of the one or more niceties of the sensor nodes of the physical WSN includes recording the niceties in at least one of an XML format, a comma separated value (csv) format, and a Java object format. Other formats not mentioned above may also be used for embedding the one or more niceties without deviating from the scope of the present technique.

In one embodiment of the present technique, the virtual WSN 340 includes the soft object which eventually represents one or more sensor nodes of the physical WSN. The soft object (not shown) may be accessed using an API specific to the type of the application language used by the developer for making edits or changes. The API or interface may allow developers to build their custom applications. In one embodiment of the present technique, the API is implemented as a web service or as a Java API. There are sets of predefined methods implemented as web services, using which a developer can develop customized applications using the physical sensor network without bothering about its internal details.

In one embodiment of the present technique, the developer may access the API for performing at least one update on the soft object, while developing the WSN application or editing the existing WSN application. The updates performed on the soft object (which represents the one or more sensors nodes of the physical WSN) may be deployed on the corresponding sensor nodes of the physical WSN, using an equivalent command.

The developer may access the soft object and make changes to the one or more parameters of the niceties. Further, the developer may deploy such changes or edits to the corresponding sensor nodes of the physical WSN by generating an equivalent command. The reverse communication module 370 may be used for rolling such changes performed on the soft object to the one or more sensor nodes of the physical WSN.

The reverse communication module 370 processes and interprets various commands issued from different applications and further generates the equivalent command that may be understood by the one or more sensor nodes. The reverse communication module 370 also provides a channel for communication from the base station 380 to the physical WSN. The reverse communication module 370 may deploy the changes on to the sensor nodes through the abstraction module 320A of the extraction module 320.

In one embodiment of the present technique, through the detailed setup explained above, the system 300 may enable the developer (not shown) to directly deploy the changes performed on the soft objects of the virtual WSN 340 on to the corresponding sensor nodes of the physical WSN 310.

The advantages of the described method include providing a means for creating a virtual WSN corresponding to a physical WSN, thereby enabling the developer to easily edit the codes or define the codes for building a WSN application. The developer need not understand a special programming language used in the WSN. The invention helps the developer to build the application by masking the communication networking complexity and may provide high level abstractions in the upper layer or soft object to build WSN application.

Exemplary Computing Environment

Figure 4:
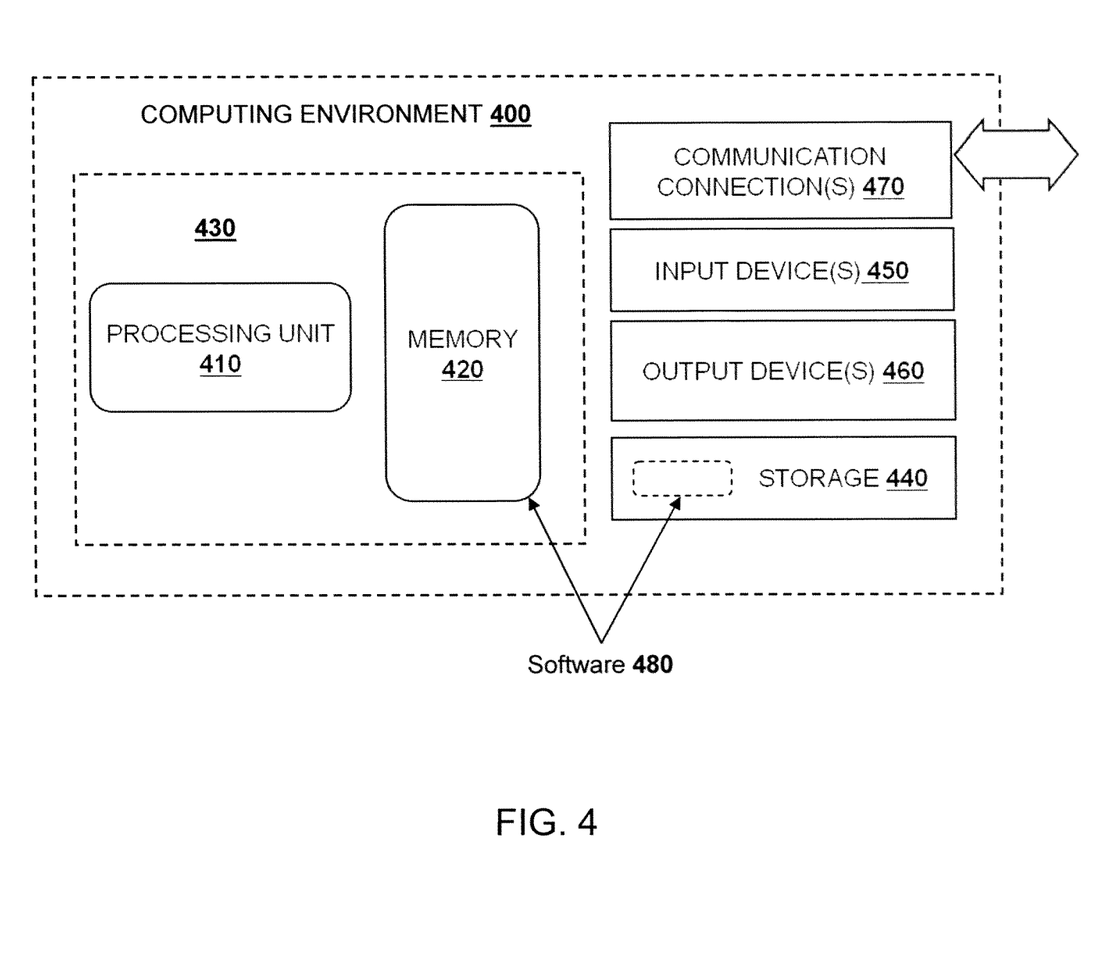
FIG. 4 is a system illustrating a generalized computer network arrangement, in one embodiment of the present technique.

One or more of the above-described techniques can be implemented in or involve one or more computer systems. FIG. 4 illustrates a generalized example of a computing environment 400. The computing environment 400 is not intended to suggest any limitation as to scope of use or functionality of described embodiments.

With reference to FIG. 4, the computing environment 400 includes at least one processing unit 410 and memory 420. In FIG. 4, this most basic configuration 430 is included within a dashed line. The processing unit 410 executes computer-executable instructions and may be a real or a virtual processor. In a multi-processing system, multiple processing units execute computer-executable instructions to increase processing power. The memory 420 may be volatile memory (e.g., registers, cache, RAM), non-volatile memory (e.g., ROM, EEPROM, flash memory, etc.), or some combination of the two. In some embodiments, the memory 420 stores software 480 implementing described techniques.

A computing environment may have additional features. For example, the computing environment 400 includes storage 440, one or more input devices 450, one or more output devices 460, and one or more communication connections 470. An interconnection mechanism (not shown) such as a bus, controller, or network interconnects the components of the computing environment 400. Typically, operating system software (not shown) provides an operating environment for other software executing in the computing environment 400, and coordinates activities of the components of the computing environment 400.

The storage 440 may be removable or non-removable, and includes magnetic disks, magnetic tapes or cassettes, CD-ROMs, CD-RWs, DVDs, or any other medium which can be used to store information and which can be accessed within the computing environment 400. In some embodiments, the storage 440 stores instructions for the software 480.

The input device(s) 450 may be a touch input device such as a keyboard, mouse, pen, trackball, touch screen, or game controller, a voice input device, a scanning device, a digital camera, or another device that provides input to the computing environment 400. The output device(s) 460 may be a display, printer, speaker, or another device that provides output from the computing environment 400.

The communication connection(s) 470 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 400, computer-readable media include memory 420, storage 440, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

The invention claimed is:

1. A method of controlling sensor nodes, the method comprising:
    extracting, with a computing device connected to a Wireless Sensor Network (WSN), WSN information comprising a communication mode used by a plurality of sensor nodes of the WSN to exchange a plurality of packets with a base station, a traversed network path of the plurality of packets, and sensor or control data included in the plurality of packets;
    transforming, with the computing device, at least one of the sensor data or the control data into a predefined format;
    embedding, with the computing device, at least a portion of the WSN information in an object including at least the transformed at least one of the sensor data or the control data;

updating, with the computing device, the object based on a defined functionality of one or more of the plurality of sensor nodes; and sending, with the computing device, one or more commands to actuate one or more electrical devices interfaced with the one or more of the plurality of sensor nodes in accordance with the defined functionality and using the updated object.

2. The method as recited in claim 1, wherein the extracting further comprises translating details of the determined communication mode into details of a predetermined communication mode.

3. The method as recited in claim 1, wherein the extracting further comprises segregating at least one of data packets or non-data packets, wherein the data packets include the sensor data and the non-data packets include the control data.

4. The method as recited in claim 1, wherein the traversed network path of the plurality of packets is an optimal path comprising at least one intermediate sensor node or direct communication to the base station.

5. The method as recited in claim 1, wherein the object is in at least one of an XML format, a common separated value (csv) format, or a java object format.

6. The method as recited in claim 1, wherein the updating further comprises generating a Graphical User Interface (GUI) for displaying the object and obtaining one or more user inputs from the GUI.

7. The method as recited in claim 1, further comprising:
adding, with the computing system, corresponding WSN information in the object when one or more new sensor nodes are added in the WSN; and
deleting, with the computing system, corresponding WSN information in the object when one or more existing sensor nodes are removed from the WSN.

8. A non-transitory computer-readable medium having stored thereon instructions for controlling sensor nodes, the instructions comprising machine executable code which, when executed by a processor, causes the processor to perform steps comprising:
extracting WSN information comprising a communication mode used by a plurality of sensor nodes of a Wireless Sensor Network (WSN) to exchange a plurality of packets with a base station, a traversed network path of the plurality of packets, and sensor or control data included in the plurality of packets;
transforming at least one of the sensor data or the control data into a predefined format;
embedding at least a portion of the WSN information in an object including at least the transformed at least one of the sensor data or the control data;
updating the object based on a defined functionality of one or more of the plurality of sensor nodes; and
sending one or more commands to actuate one or more electrical devices interfaced with the one or more of the plurality of sensor nodes in accordance with the defined functionality and using the updated object.

9. The medium as recited in claim 8, wherein the extracting further comprises translating details of the determined communication mode into details of a predetermined communication mode.

10. The medium as recited in claim 8, wherein the extracting further comprises segregating at least one of data packets or non-data packets, wherein the data packets include the sensor data and the non-data packets include the control data.

11. The medium as recited in claim 8, wherein the traversed network path of the plurality of packets is an optimal path comprising at least one intermediate sensor node or direct communication to the base station.

12. The medium as recited in claim 8, wherein the object is in at least one of an XML format, a common separated value (csv) format, or a java object format.

13. The medium as recited in claim 8, wherein the updating further comprises generating a Graphical User Interface (GUI) for displaying the object and obtaining one or more user inputs from the GUI.

14. The medium as recited in claim 8, further having stored thereon instructions comprising machine executable code which, when executed by the processor, causes the processor to perform steps further comprising:
adding corresponding WSN information in the object when one or more new sensor nodes are added in the WSN; and
deleting corresponding WSN information in the object when one or more existing sensor nodes are removed from the WSN.

15. A computing device, comprising:
a processor; and
a memory coupled to the processor which is configured to execute programmed instructions stored in the memory, the programmed instructions comprising:
extracting WSN information comprising a communication mode used by a plurality of sensor nodes of a Wireless Sensor Network (WSN) to exchange a plurality of packets with a base station, a traversed network path of the plurality of packets, and sensor or control data included in the plurality of packets;
transforming at least one of the sensor data or the control data into a predefined format;
embedding at least a portion of the WSN information in an object including at least the transformed at least one of the sensor data or the control data;
updating the object based on a defined functionality of one or more of the plurality of sensor nodes; and
sending one or more commands to actuate one or more electrical devices interfaced with the one or more of the plurality of sensor nodes in accordance with the defined functionality and using the updated object.

16. The device as recited in claim 15, wherein the extracting further comprises translating details of the determined communication mode into details of a predetermined communication mode.

17. The device as recited in claim 15, wherein the extracting further comprises segregating at least one of data packets or non-data packets, wherein the data packets include the sensor data and the non-data packets include the control data.

18. The device as recited in claim 15, wherein the traversed network path of the plurality of packets is an optimal path comprising at least one intermediate sensor node or direct communication to the base station.

19. The device as recited in claim 15, wherein the object is in at least one of an XML format, a common separated value (csv) format, or a java object format.

20. The device as recited in claim 15, wherein the updating further comprises generating a Graphical User Interface (GUI) for displaying the object and obtaining one or more user inputs from the GUI.

21. The device as recited in claim 15, wherein the processor is further configured to execute programmed instructions stored in the memory further comprising:
adding corresponding WSN information in the object when one or more new sensor nodes are added in the WSN; and deleting corresponding WSN information in the object when one or more existing sensor nodes are removed from the WSN.

\* \* \* \* \*